(12) United States Patent
Lee et al.

(10) Patent No.: US 11,659,468 B2
(45) Date of Patent: May 23, 2023

(54) METHOD AND APPARATUS FOR LINK CONFIGURATION AND ROUTING OF RELAY SYSTEM

(71) Applicant: ELECTRONICS AND TELECOMMUNICATIONS RESEARCH INSTITUTE, Daejeon (KR)

(72) Inventors: Nam Suk Lee, Daejeon (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/409,038

(22) Filed: Aug. 23, 2021

(65) Prior Publication Data

US 2022/0132392 A1 Apr. 28, 2022

(30) Foreign Application Priority Data

Oct. 22, 2020 (KR) .......... 10-2020-0137886
Jul. 5, 2021 (KR) .......... 10-2021-0087810

(51) Int. Cl.
*H04W 12/102* (2021.01)
*H04W 40/24* (2009.01)
*H04W 8/28* (2009.01)
*H04W 88/04* (2009.01)
*H04W 92/18* (2009.01)

(52) U.S. Cl.
CPC .......... *H04W 40/248* (2013.01); *H04W 8/28* (2013.01); *H04W 12/102* (2021.01); *H04W 88/04* (2013.01); *H04W 92/18* (2013.01)

(58) Field of Classification Search
CPC .. H04W 76/12; H04W 76/25; H04W 28/0967
See application file for complete search history.

(56) References Cited

U.S. PATENT DOCUMENTS

| 10,966,259 | B2 | 3/2021 | Lee et al. | |
| 2008/0130575 | A1 | 6/2008 | Jun et al. | |
| 2012/0069788 | A1* | 3/2012 | Shen | H04W 74/006 370/315 |

(Continued)

FOREIGN PATENT DOCUMENTS

KR 10-2018-0050071 A 5/2018
KR 10-2019-0103468 A 9/2019

*Primary Examiner* — Nathan S Taylor
(74) *Attorney, Agent, or Firm* — LRK Patent Law Firm

(57) ABSTRACT

An operation method of a first terminal may include: configuring a Uu access link with a base station, and receiving a first message from the base station, the first message including a relay RNTI for identifying the first terminal, a node address of the base station, and a RAP entity ID for identifying a RAP entity configured for the first terminal; configuring a relay link with a second terminal when communication with the base station is disconnected; requesting link switching by transmitting to the base station a second message via the second terminal, the second message including the relay RNTI, node address, and RAP entity ID; and receiving a response to the second message from the base station via the second terminal, and switching a link with the base station from the Uu access link to the relay link.

6 Claims, 18 Drawing Sheets

(56) References Cited

U.S. PATENT DOCUMENTS

| | | | |
|---|---|---|---|
| 2012/0082099 A1* | 4/2012 | Bienas | H04W 74/008 |
| | | | 370/329 |
| 2013/0183971 A1 | 7/2013 | Tamaki et al. | |
| 2017/0244705 A1 | 8/2017 | Ha et al. | |
| 2019/0394128 A1 | 12/2019 | Yang et al. | |
| 2020/0045610 A1 | 2/2020 | Shih et al. | |
| 2020/0092758 A1 | 3/2020 | Youn et al. | |
| 2020/0213909 A1 | 7/2020 | Oh | |
| 2020/0288511 A1 | 9/2020 | Burbidge et al. | |
| 2020/0296749 A1 | 9/2020 | Freda et al. | |
| 2021/0014768 A1 | 1/2021 | Hong | |
| 2021/0352767 A1* | 11/2021 | Paladugu | H04W 88/04 |
| 2022/0086930 A1* | 3/2022 | Lee | H04W 76/14 |
| 2022/0141176 A1* | 5/2022 | Padebettu | H04L 61/103 |
| | | | 370/389 |
| 2022/0369225 A1* | 11/2022 | Iyer | H04L 5/0053 |

* cited by examiner

METHOD AND APPARATUS FOR LINK CONFIGURATION AND ROUTING OF RELAY SYSTEM

CROSS-REFERENCE TO RELATED APPLICATIONS

This application claims priority to Korean Patent Applications No. 10-2020-0137886 filed on Oct. 22, 2020 and No. 10-2021-0087810 filed on Jul. 5, 2021 with the Korean Intellectual Property Office (KIPO), the entire contents of which are hereby incorporated by reference.

BACKGROUND

1. Technical Field

The present disclosure relates to a technique for link configuration and routing of a relay system, and more particularly, to a technique for link configuration and routing of a relay system that continues communication service via a relay when communication with a base station is disconnected.

2. Description of Related Art

In order to process wireless data that increases rapidly after commercialization of the fourth generation (4G) communication system (e.g., long term evolution (LTE) communication system or LTE-Advanced (LTE-A) communication system), a fifth generation (5G) communication system (e.g., new radio (NR) communication system) using not only a frequency band (e.g., frequency band of 6 GHz or below) of the 4G communication system but also a frequency band (e.g., frequency band of 6 GHz or above) higher than the frequency band of the 4G communication system is being considered. The 5G communication system may support enhanced Mobile BroadBand (eMBB), Ultra-Reliable and Low Latency Communication (URLLC), and massive Machine Type Communication (mMTC).

Meanwhile, among the communication systems, a millimeter wave-based mobile communication system may provide a broadband service using beamforming. In the millimeter wave-based mobile communication system, a terminal may frequently experience communication service blockages due to obstacles such as trees, traffic signs, and automobiles according to millimeter wave frequency characteristics. In such the case, if an adjacent terminal performs a role of a relay, service continuity may be guaranteed to the terminal (i.e., remote terminal) whose communication service is disconnected. To this end, the adjacent terminal may perform forwarding of relay traffic of the terminal whose communication service is disconnected. As such, in order for the adjacent terminal to perform forwarding of relay traffic, a signaling procedure for link switching and a signaling procedure for registering, changing, and releasing routing information for the data forwarding may be required.

SUMMARY

Accordingly, exemplary embodiments of the present disclosure are directed to providing a method and an apparatus for link and routing configuration of a relay system, which can provide a procedure of link switching for an adjacent terminal to perform forwarding of relay traffic, and a procedure of registering, changing, and releasing routing information.

According to a first exemplary embodiment of the present disclosure, an operation method of a first terminal in a communication system may comprise: configuring a Uu access link with a base station, and receiving a first message from the base station, the first message including a relay radio network temporary identifier (RNTI) for identifying the first terminal, a node address of the base station, and a relay adaptation protocol (RAP) entity identifier (ID) for identifying a RAP entity configured for the first terminal; configuring a relay link with a second terminal when communication with the base station is disconnected; requesting link switching by transmitting to the base station a second message via the second terminal, the second message including the relay RNTI, the node address, and the RAP entity ID; and receiving a response to the second message from the base station via the second terminal, and switching a link with the base station from the Uu access link to the relay link.

The requesting of the link switching may comprise: generating a first message authentication code for integrity (MAC-I) by processing integrity protection based on the relay RNTI, the node address, and the RAP entity; generating the second message including the relay RNTI, the node address, the RAP entity, and the first MAC-I information; and requesting the link switching by transmitting the second message to the base station via the second terminal.

The receiving of the response and the switching of the link may comprise: receiving the response to the second message including the relay RNTI, the node address, and a second MAC-I from the base station via the second terminal; generating a third MAC-I by processing integrity protection based on the relay RNTI and the node address; and in response to determining that the third MAC-I and the second MAC-I match, switching the link with the base station from the Uu access link to the relay link, and transmitting uplink data through the relay link.

The operation method may further comprise, after the configuring of the relay link, configuring a routing table entry based on the node address, the RAP entity ID, and a first branch node address received from the second terminal in the configuring of the relay link; and in response to receiving the response to the second message from the base station, activating the routing table entry.

The operation method may further comprise: receiving, from the second terminal, a third message requesting update of the routing table entry, the third message including a second branch node address; and updating the routing table entry by reflecting the second branch node address.

The operation method may further comprise: starting a timer after transmitting the second message; and releasing the relay link if the response to the second message is not received within a waiting time defined by the timer.

According to a second exemplary embodiment of the present disclosure, an operation method of a second terminal in a communication system may comprise: configuring a relay link with a first terminal; receiving, from the first terminal, a second message requesting link switching, and transmitting the second message to a second base station, the second message including a root node address that is a node address of a first base station to which the first terminal is connected, and a relay adaptation protocol (RAP) entity ID for identifying a RAP entity for the first terminal configured in the first base station; configuring a routing table entry based on the root node address, the RAP entity ID, and a node address of the second base station; receiving a third message from the second base station in response to the second message, and transmitting the third message to the first terminal, the third message including the root node address and the RAP entity ID; and activating the routing table entry.

The configuring of the routing table entry may comprise: receiving the node address of the second base station from the second base station; detecting the root node address and the RAP entity ID in the second message; and configuring the routing table entry based on the root node address, the RAP entity ID, and the node address of the second base station.

The activating of the routing table entry may comprise: searching a routing table based on the root node address and the RAP entity ID of the third message; and activating the routing table entry when the routing table entry associated with the root node address and the RAP entity ID is retrieved in the routing table.

The operation method may further comprise: receiving, from the first terminal, a fourth message including the root node address and the RAP entity ID; searching a routing table based on the root node address and the RAP entity ID of the fourth message; and when the routing table entry associated with the root node address and the RAP entity ID is retrieved in the routing table, transmitting the fourth message based on the retrieved routing table entry.

The operation method may further comprise: receiving a node address of a third base station from the third base station by being connected to the third base station through inter-cell movement; and updating the routing table entry by reflecting the node address of the third base station received from the third base station.

According to a third exemplary embodiment of the present disclosure, an operation method of a base station in a communication system may comprise: transmitting a first message to a first terminal when the first terminal configures a Uu access link with the base station by being connected to the base station, the first message including a relay radio network temporary identifier (RNTI) for identifying the first terminal, a node address of the base station, and a relay adaptation protocol (RAP) entity identifier (ID) for identifying a RAP entity configured for the first terminal; receiving, from the first terminal, a second message requesting link switching via a second terminal, the second message including the relay RNTI, the root node address, and the RAP entity ID; identifying the Uu access link connected with the first terminal by using the relay RNTI and the RAP entity ID according to the second message requesting link switching, and switching a link with the first terminal from the Uu access link to a relay link via the second terminal; and transmitting, to the first terminal, a third message informing completion of the link switching via the second terminal, the third message including the relay RNTI, the node address, and the RAP entity ID.

The switching of the link may comprise: identifying the first terminal based on the relay RNTI of the second message; identifying the Uu access link corresponding to the first terminal by using the RAP entity ID; and switching the link with the first terminal from the identified Uu access link to the relay link via the second terminal.

The operation method may further comprise: configuring a routing table entry based on the node address and the RAP entity ID upon receiving the first message; performing an integrity check on the second message; and activating the routing table entry if the integrity check is successful.

According to the exemplary embodiments of the present disclosure, the terminal relay system may provide a procedure of link switching from a Uu access link to a relay link for a terminal whose communication service is disconnected. In addition, according to the exemplary embodiments of the present disclosure, the terminal relay system may provide a procedure of registering, changing, and releasing routing information for data forwarding of a terminal whose communication service is disconnected. In addition, according to the exemplary embodiments of the present disclosure, by providing a terminal relay signaling procedure, a terminal whose communication service is disconnected due to an obstacle or the like may transmit and receive data using a relay function of an adjacent terminal. In addition, according to the exemplary embodiments of the present disclosure, by providing a terminal relay signaling procedure, a terminal not capable of transmitting and receiving data outside a cell coverage may transmit and receive data using a relay function of an adjacent terminal.

DETAILED DESCRIPTION OF THE EMBODIMENTS

Figure 1:
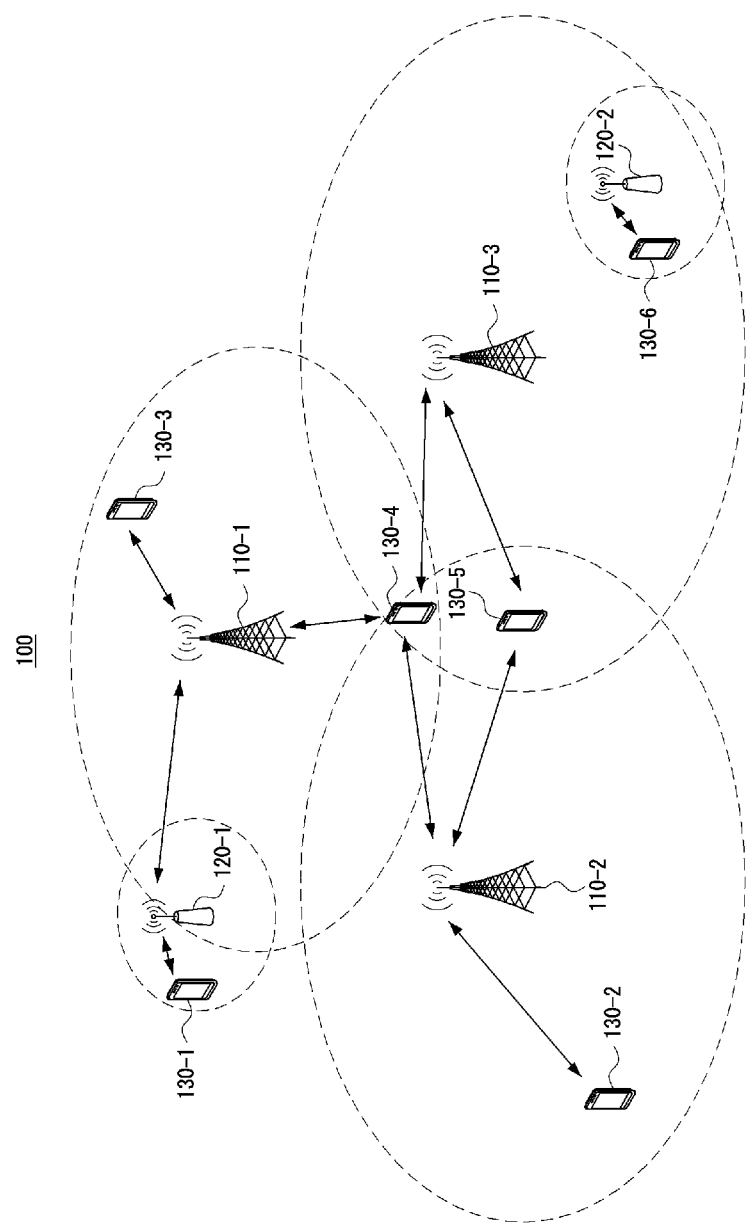
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
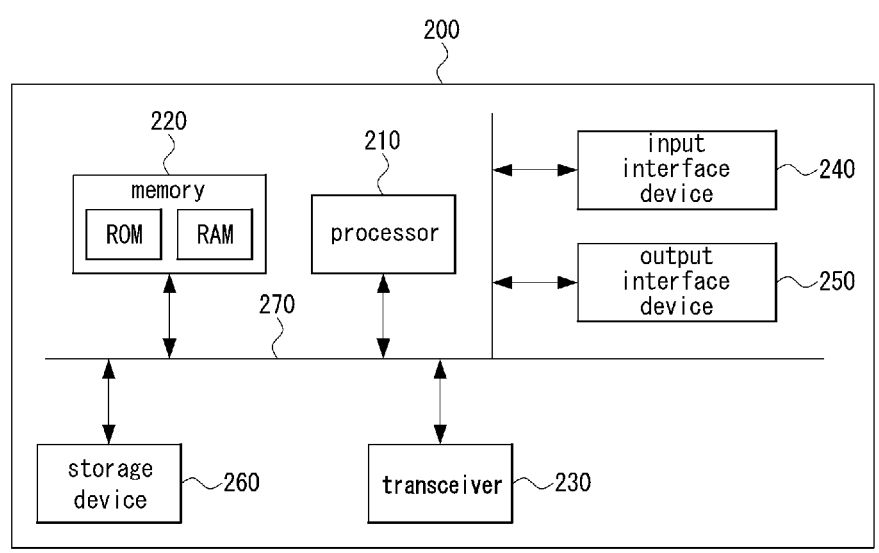
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each of the components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, a millimeter wave-based mobile communication system may provide a broadband service using beamforming. In the millimeter wave-based mobile communication system, a terminal may frequently experience communication service blockages due to obstacles such as trees, traffic signs, and automobiles according to millimeter wave frequency characteristics. In such the case, if an adjacent terminal performs a role of a relay, service continuity may be guaranteed to the terminal whose communication service is disconnected.

Figure 3:
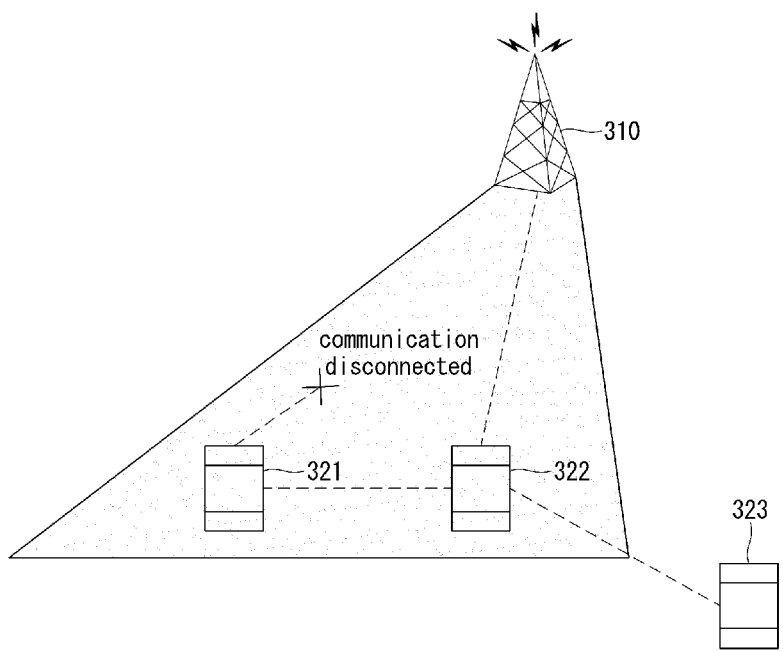
FIG. 3 is a conceptual diagram illustrating a first exemplary embodiment of a terminal relay system.

FIG. 3 is a conceptual diagram illustrating a first exemplary embodiment of a terminal relay system.

Referring to FIG. 3, a terminal relay system may include a base station 310, a first terminal 321, a second terminal 322, and a third terminal 323. The first terminal 321 and the second terminal 322 may be located in a communication service coverage of the base station 310, and the third terminal 323 may be located out of the communication service coverage of the base station 310. Here, the third terminal 323 may move out of the communication service coverage of the base station 310 due to a movement therefrom. As such, when the third terminal 323 is located out of the communication service coverage of the base station 310, the third terminal 323 may access the base station 310 via the second terminal 322 to perform data transmission and reception with the base station 310. In this case, the second terminal 322 may relay communication between the base station 310 and the third terminal 323. On the other hand, since the first terminal 321 is located in the communication service coverage of the base station 310, the first terminal 321 may directly access the base station 310 to transmit and receive data to and from the base station 310. In this case, the first terminal 321 may enter a communication disconnected (e.g., blockage) state in which data cannot be transmitted/received to and from the base station 310 due to an obstacle or the like. In this case, the first terminal 321 may access the base station 310 via the second terminal 322 to transmit and receive data to and from the base station 310. Accordingly, the second terminal 322 may relay communication between the base station 310 and the first terminal 321. When a communication disconnected state occurs in which data cannot be directly transmitted/received to and from the base station 310 due to an obstacle or the like as in the case of the first terminal 321, the terminal relay system may use the adjacent second terminal 322 as a relay so that the first terminal 321 continues to perform data transmission and reception with the first base station 310. In addition, when a terminal is unable to transmit and receive data to and from the base station 310 outside the cell coverage as in the case of the third terminal 323, the terminal relay system may use the adjacent second terminal 322 as a relay so that the third terminal 323 continues to perform data transmission and reception with the first base station 310.

Figure 4:
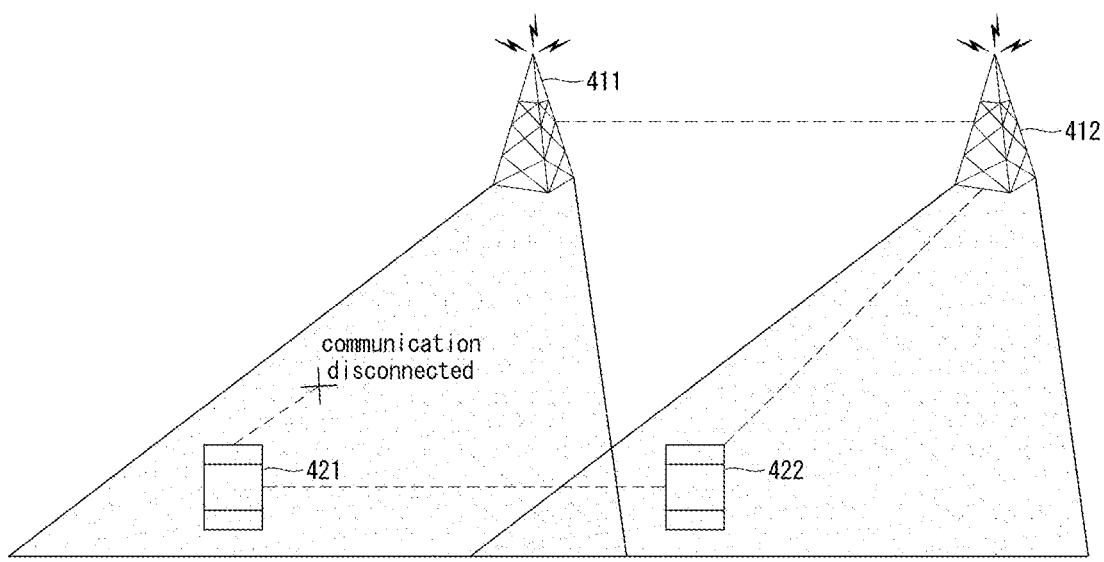
FIG. 4 is a conceptual diagram illustrating a second exemplary embodiment of a terminal relay system.

FIG. 4 is a conceptual diagram illustrating a second exemplary embodiment of a terminal relay system.

Referring to FIG. 4, a terminal relay system may include a first base station 411, a second base station 412, a first terminal 421, and a second terminal 422. The first terminal 421 may be located in a communication service coverage of the first base station 412, and the second terminal 422 may be located in a communication service coverage of the second base station 412. As such, since the first terminal 421 is located in the communication service coverage of the first base station 411, the first terminal 421 may directly access the first base station 411 to transmit and receive data to and from the first base station 411. In addition, since the second terminal 422 is located in the communication service coverage of the second base station 412, the second terminal 422 may directly access the second base station 412 to transmit and receive data to and from the second base station 412. From such the state, the first terminal 421 may enter a communication disconnected state in which data cannot be transmitted and received to and from the first base station 411 due to an obstacle or the like. In this case, the first terminal 421 may access the first base station 411 via the second terminal 422 and the second base station 412 to transmit and receive data to and from the first base station 411. In this case, the second terminal 422 may relay communication between the second base station 412 and the first terminal 421. In addition, the second base station 412 may relay communication between the first base station 411 and the second terminal 422. As such, even when the second terminal 422 adjacent to the first terminal 421 is located out of the communication service coverage of the first base station 411 providing a communication service to the first terminal 421, the terminal relay system may enable continuous data transmission/reception between the first base station 411 and the first terminal 421 via the second base station 412 providing a communication service to the second terminal 422.

Figure 5:
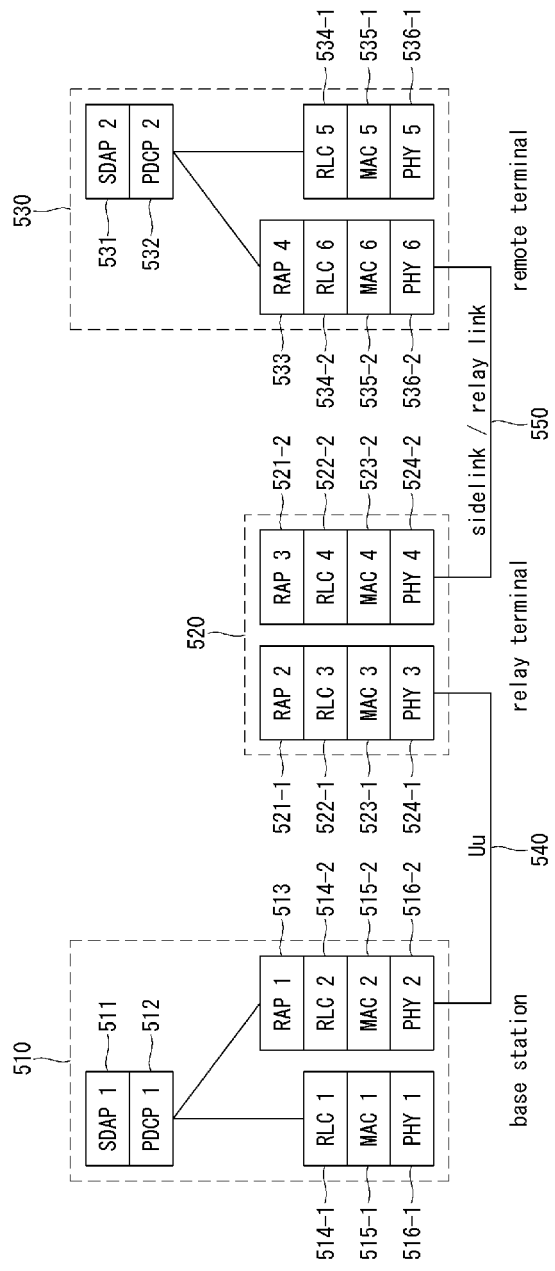
FIG. 5 is a diagram of a protocol stack structure of a terminal relay system according to a first exemplary embodiment.

FIG. 5 is a diagram of a protocol stack structure of a terminal relay system according to a first exemplary embodiment.

Referring to FIG. 5, a protocol stack structure of the terminal relay system may include a protocol stack structure of a base station 510, a protocol stack structure of a relay terminal 520, and a protocol stack structure of a remote terminal 530.

Here, the protocol stack structure of the base station 510 may include a first service data adaptation protocol (SDAP) layer 511, a first packet data convergence protocol (PDCP) layer 512, a first relay adaptation protocol (RAP) layer 513, a first radio link control (RLC) layer 514-1, a second RLC layer 514-2, a first medium access control (MAC) layer 515-1, a second MAC layer 515-2, a first physical (PHY) layer 516-1, and a second PHY layer 516-2. In the protocol stack structure of the base station 510, the first SDAP layer 511, the first PDCP layer 512, the first RLC layer 514-1, the first MAC layer 515-1, and the first PHY layer 516-1 may support direct transmission and reception of data through a Uu access link of a Uu interface before the remote terminal 530 enters a communication disconnected state. In addition, when the remote terminal 530 enters a communication disconnected state, the first SDAP layer 511, the first PDCP layer 512, the first RAP layer 513, the second RLC layer 514-2, the second MAC layer 515-2, and the second PHY layer 516-2 in the protocol stack structure of the base station 510 may support communication through a Uu access link 540 of a Uu interface with the relay terminal 520, thereby transmitting and receiving data to and from the remote terminal 530 via the relay terminal 520.

Meanwhile, the protocol stack structure of the relay terminal 520 may include a second RAP layer 521-1, a third RAP layer 521-2, a third RLC layer 522-1, a fourth RLC layer 522-2, a third MAC layer 523-1, a fourth MAC layer 523-2, a third PHY layer 524-1, and a fourth PHY layer 524-2. In the protocol stack structure of the relay terminal 520, the second RAP layer 521-1, the third RLC layer 522-1, the third MAC layer 523-1, and the first PHY layer 524-1 may support communication with the base station 510 through the Uu access link 540 of the Uu interface. In contrast, in the protocol stack structure of the relay terminal 520, the third RAP layer 521-2, the fourth RLC layer 522-2, the fourth MAC layer 523-2, and the fourth PHY layer 524-2 may support communication with the remote terminal 530 through a sidelink or a relay link 550.

In addition, the protocol stack structure of the remote terminal 530 may include a second SDAP layer 531, a second PDCP layer 532, a fourth RAP layer 533, a fifth RLC layer 534-1, a sixth RLC layer 534-2, a fifth MAC layer 535-1, a sixth MAC layer 535-2, a fifth PHY layer 536-1, and a sixth PHY layer 536-2. In the protocol stack structure of the remote terminal 530, the second SDAP layer 531, the second PDCP layer 532, the fifth RLC layer 534-1, the fifth MAC layer 535-1, and the fifth PHY layer 536-1 may support direct data transmission and reception with the base station 510 through a Uu access link before the remote terminal enters a communication disconnected state. In contrast, in the protocol stack structure of the remote terminal 530, the second SDAP layer 531, the second PDCP layer 532, the fourth RAP layer 533, the sixth RLC layer 534-2, the sixth MAC The layer 535-2, and the sixth PHY layer 536-2 may support communication with the relay terminal 520 through the sidelink or a relay link 550 when the remote terminal 530 enters a communication disconnected state.

As described above, in the terminal relay system, the first RAP layer 513 may be added in the protocol stack structure of the base station 510 as a lower layer of the first PDCP layer 512 so that the base station 510 communicates with the relay terminal 520 to transmit and receive data to and from the remote terminal 530, and the second RLC layer 514-2, the second MAC layer 515-2, the second PHY layer 516-2 may be provided to support the added first RAP layer 513. In addition, in the terminal relay system, the second RAP layer 521-1 may be added in the protocol stack structure of the relay terminal 520 so that the relay terminal 520 communicates with the base station 510 to transmit and receive data to and from the base station 510, and the third RLC layer 522-1, the third MAC layer 523-1, and the third PHY layer 524-1 may be provided to support the added second RAP layer 521-1.

In addition to these, in the terminal relay system, the third RAP layer 521-2 may be added in the protocol stack structure of the relay terminal 520 so that the relay terminal 520 communicates with the remote terminal 530 to transmit and receive data to and from the remote terminal 530, and the fourth RLC layer 522-2, the fourth MAC layer 523-2, and the fourth PHY layer 524-2 may be provided to support the added third RAP layer 521-2. Further, in the terminal relay system, the fourth RAP layer 533 may be added in the protocol stack structure of the remote terminal 530 as a lower layer of the second PDCP layer 532 so that the remote terminal 530 can communicate with the relay terminal 520 to transmit and receive data to and from the relay terminal 520, and the sixth RLC layer 534-2, the sixth MAC layer 535-2, and the sixth PHY layer 536-2 may be provided to support the added fourth RAP layer 533. As described above, in order to support the relay function, the first RAP layer 513 and the fourth RAP layer 533 may be located between the PDCP layers 512 and 532 and the RLC layers 514-1, 514-2, 534-1, and 534-2 according to the general protocol stack structure including the SDAP layers 511 and 531, PDCP layers 512 and 532, RLC layers 514-1, 514-2, 534-1, and 534-2, and MAC layer 515-1, 515-2, 535-1, and 535-2.

As described above, the terminal relay system may use a plurality of RAP layers 513, 521-1, 521-2, and 533 to provide relay to the base station 510 through the relay terminal 520 adjacent to the remote terminal 530. The base station 510 and the remote terminal 530 may perform data transmission and reception with the relay terminal 520 through data relaying using the first and fourth RAP layers 513 and 533 when normal data transmission and reception is impossible through a Uu access link. Then, data transmission/reception between the base station 510 and the remote terminal 530 may be relayed using the second RAP layer 521-1 and the third RAP layer 521-2 of the relay terminal 520. To this end, the plurality of RAP layers 513, 521-1, 521-2, and 533 may perform functions of registering, changing, and releasing routing information for data transmission and reception between the base station 510 and the remote terminal 530.

In such the situation, when the remote terminal 530 enters a communication disconnected state and direct data communication with the base station 510 using a Uu access link is impossible, the remote terminal 530 may perform data communication with the base station 510 through the relay terminal 520 capable of communicating with the base station 510 using the Uu access link 540.

Figure 6:
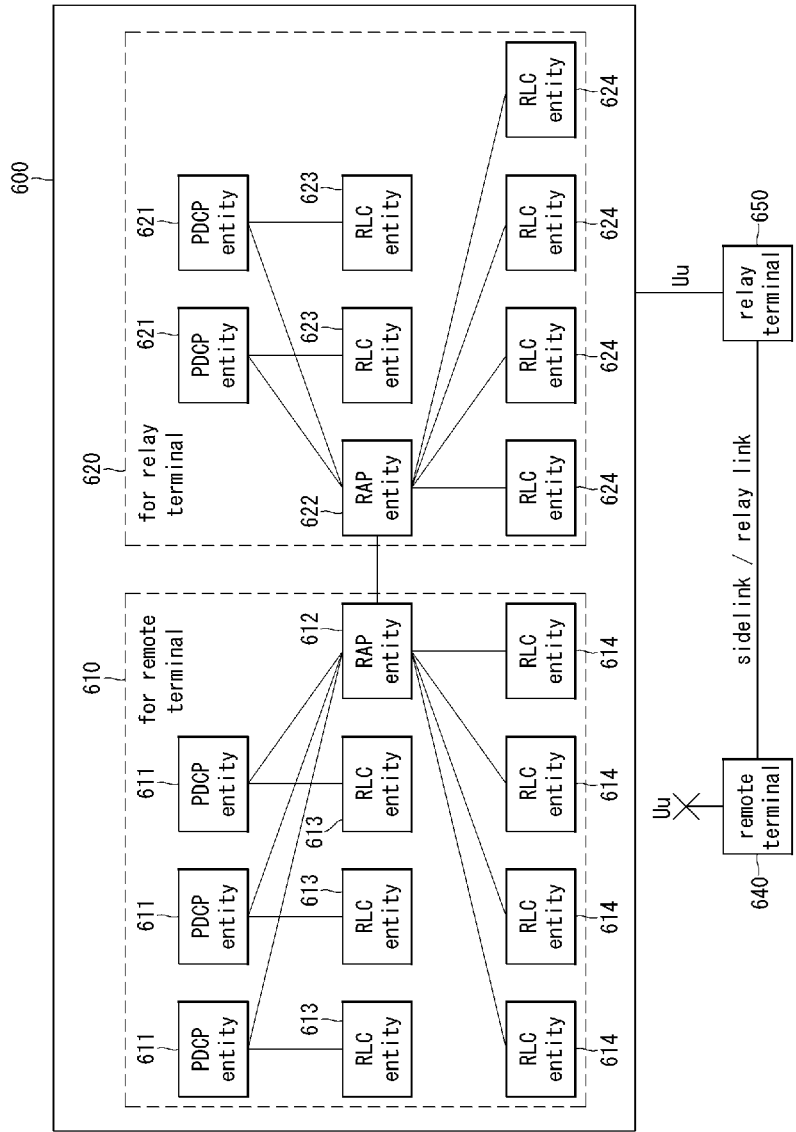
FIG. 6 is a block diagram illustrating a first exemplary embodiment of entities of a terminal relay system.

FIG. 6 is a block diagram illustrating a first exemplary embodiment of entities of a terminal relay system.

Referring to FIG. 6, a structure of entities of the terminal relay system may include an entity structure 610 for remote terminals and an entity structure 620 for relay terminals in a base station 600. Here, a remote terminal 640 may also support a relay function. Here, the entity structure 610 for remote terminals in the base station 600 may include a plurality of remote terminal (rUE) PDCP entities 611, a rUE RAP entity 612, a plurality of rUE RLC entities 613 not associated with the RAP entity 612, and a plurality of rUE RLC entities 614 associated with the RAP entity 612. In addition, the entity structure 620 for relay terminals in the base station 600 may include a plurality of relay terminal (RUE) PDCP entities 621, a RUE RAP entity 622, a plurality of RUE RLC entities 623 not associated with the RAP entity 622, and a plurality of RUE RLC entities 624 associated with the RAP entity 622.

As described above, the base station 600 may configure the RAP entities 612 and 622 when initial connection configuration with the terminals 640 and 650 is completed. That is, the base station 600 may configure the RAP entities 612 and 622 for the respective terminals 640 and 650 when the initial connection configuration with all the terminals 640 and 650 supporting the relay function is completed. In this case, the base station 600 may control the terminals 640 and 650 so that the terminals 640 and 650 may configure the RAP entities and the RLC entities associated with the RAP entities. Then, when the remote terminal 640 enters a communication disconnected state and a relay connection is configured using the relay terminal 650, the base station 600 may connect the rUE RAP entity 612 and the RUE RAP entity 622 to perform relay data transmission and reception.

Meanwhile, the RAP entities of the RAP layer may perform routing to transmit relay data to a next node or terminal. As such, in order for the RAP entity to perform routing, relay-related addresses and identifiers (IDs) for data transmission may be required.

Figure 7:
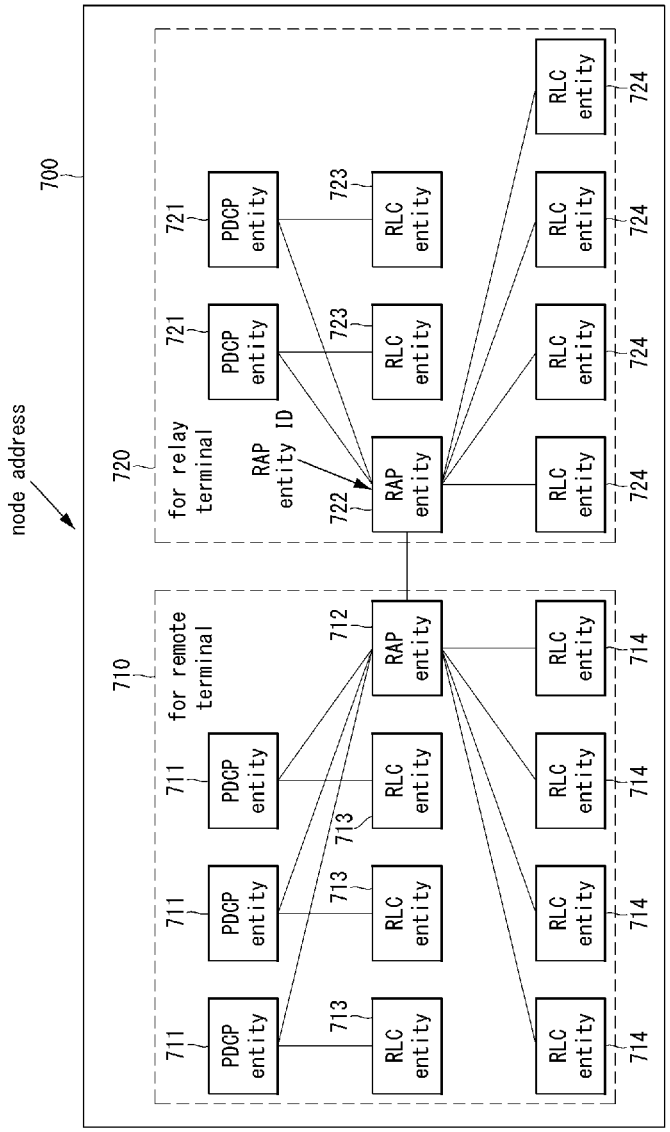
FIG. 7 is a conceptual diagram illustrating a method of assigning addresses and identifiers to a base station and entities of the base station.

FIG. 7 is a conceptual diagram illustrating a method of assigning addresses and identifiers to a base station and entities of the base station.

Referring to FIG. 7, a structure of entities of the base station may include an entity structure 710 for remote terminals and an entity structure 720 for relay terminals. Here, the entity structure 710 for remote terminals of the base station 700 may include a plurality of rUE PDCP entities 711, a rUE RAP entity 712, a plurality of rUE RLC entities 713 not associated with the rUE RAP entity 712, and a plurality of rUE RLC entities 714 associated with rUE RAP entity 712. In addition, the entity structure 720 for relay terminals of the base station 700 may include a plurality of RUE PDCP entities 721, a RUE RAP entity 722, a plurality of RUE RLC entities 723 not associated with the RUE RAP entity 722, and a plurality of RUE RLC entities 724 associated with the RUE RAP entity 722.

The base station 700 may have a node address. The node address may be classified into a root node address and a branch node address according to a type of a terminal to which the base station provides a communication service. Here, a root node address may refer to an address of a base station in which an RRC and PDCP for a remote terminal are configured to provide a communication service to the remote terminal. The remote terminal may receive a node address from the corresponding base station and configure it as a root node address. In addition, the remote terminal may transmit the root node address to a relay terminal. Meanwhile, a branch node address may refer to a node address of a base station that provides a communication service to a relay terminal supporting a Uu access link among relay terminals. The relay terminal may access the corresponding base station to receive the node address and configure it as a branch node address. In addition, the relay terminal may transmit the branch node address to the remote terminal. Accordingly, the remote terminal and the relay terminal may determine whether the root node address and the branch node address are the same. When the root node address and the branch node address are the same, the remote terminal and the relay terminal may determine that the base station to which the remote terminal was connected before a disconnection of communication is the same as the base station to which the relay terminal is connected. On the other hand, when the root node address and the branch node address are different, the remote terminal and the relay terminal may determine that the base station to which the remote terminal was connected before a disconnection of communication is different from the base station to which the relay terminal is connected.

The base station 700 may assign a RAP entity ID to each of the RAP entities 712 and 722. That is, the base station 700 may assign a rUE RAP entity ID to the rUE RAP entity 712, and may assign a RUE RAP entity ID to the RUE RAP entity 722. As such, the base station 700 may assign different RAP entity IDs to the rUE RAP entity 712 and the RUE RAP entity 722. Accordingly, the base station 700 may identify the remote terminal using the root node address and the rUE RAP entity ID. Similarly, the base station may identify the relay terminal using the branch node address and the RUE RAP entity ID.

The base station 710 may configure the RUE PDCP entity 721 and the RUE RLC entity 724 when the relay terminal completes connection configuration through the Uu access link. The base station 710 may deliver root node address information, RAP entity ID information, and the like to the relay terminal through a control message, etc. The relay terminal receiving the information may configure the RAP entity and the RLC entity, and store the information on the root node address, RAP entity ID, and the like.

Figure 8:
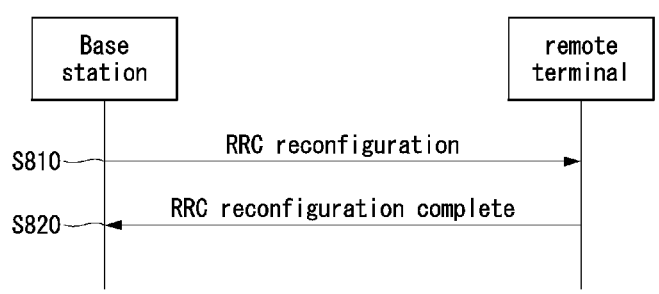
FIG. 8 is a sequence chart illustrating a first exemplary embodiment of a method for configuring a link between a remote terminal and a base station.

FIG. 8 is a sequence chart illustrating a first exemplary embodiment of a method for configuring a link between a remote terminal and a base station.

Referring to FIG. 8, in the method for configuring a link between a remote terminal and a base station, if the remote terminal is connected to the base station before a communication service with the base station is disconnected, the base station may transmit to the remote terminal an RRC reconfiguration message including a relay radio network temporary identifier (RNTI), a node address, a RAP entity ID, and the like (S810). As such, the remote terminal may receive the RRC reconfiguration message including the relay RNTI, node address, RAP entity ID, and the like from the base station, store the information, and transmit an RRC reconfiguration complete message to the base station in response thereto (S820). In this case, the remote terminal may configure the node address received from the base station as a root node address.

Meanwhile, when the remote terminal enters a communication disconnected state in which data transmission and reception cannot be performed through a Uu access link due to an obstacle or the like, the remote terminal may configure a sidelink or relay link with an adjacent terminal.

Figure 9:
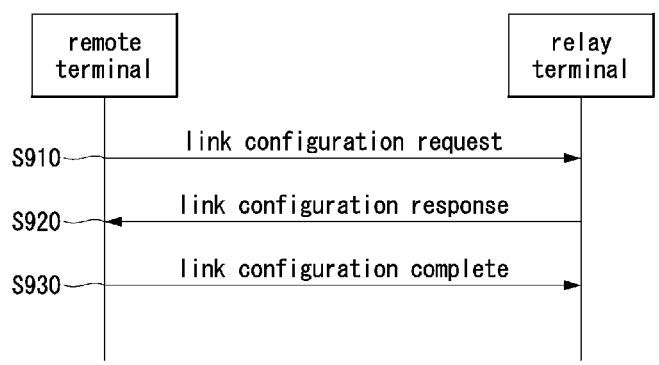
FIG. 9 is a sequence chart illustrating a first exemplary embodiment of a method for configuring a link between a remote terminal and a relay terminal.

FIG. 9 is a sequence chart illustrating a first exemplary embodiment of a method for configuring a link between a remote terminal and a relay terminal.

Referring to FIG. 9, in the method for configuring a link between a remote terminal and a relay terminal, if the remote terminal enters a communication disconnected state in which data transmission and reception cannot be performed with the base station through the Uu access link due to an obstacle or the like, the remote terminal may transmit a link configuration request message to the relay terminal in order to configure a side link or a relay link with the relay terminal (S910). Then, in response to the link configuration request message, the relay terminal may transmit a link configuration response message including a node address of a currently connected base station to the remote terminal (S920). Accordingly, the remote terminal may configure the node address included in the link configuration response message received from the relay terminal as a branch node address, and may transmit a link configuration complete message to the relay terminal (S930). Through this process, an RRC entity of the remote terminal may perform link switching from the Uu access link to the relay link when the configuration of the side link or the relay link is completed.

Figure 10:
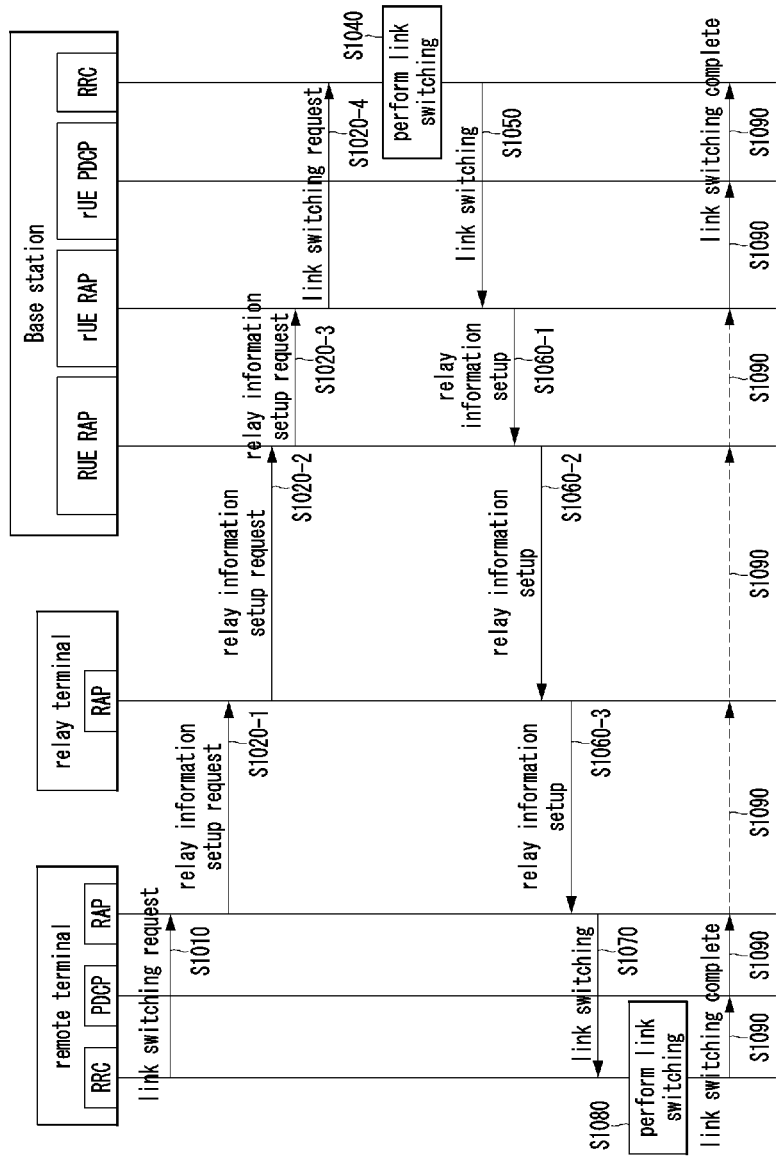
FIG. 10 is a sequence chart illustrating a first exemplary embodiment of a method for switching a link with a remote terminal from a Uu access link to a relay link.

FIG. 10 is a sequence chart illustrating a first exemplary embodiment of a method for switching a link with a remote terminal from a Uu access link to a relay link.

Referring to FIG. 10, in the method for switching a link with a remote terminal from a Uu access link to a relay link, an RRC entity of the remote terminal may configure a link switching request message and deliver it to a RAP entity when configuration of the relay link is completed (S1010). A process in which the RRC entity of the remote terminal configures the link switching request message and transmits it to the relay terminal may be described in detail with reference to FIG. 11 as follows.

Figure 11:
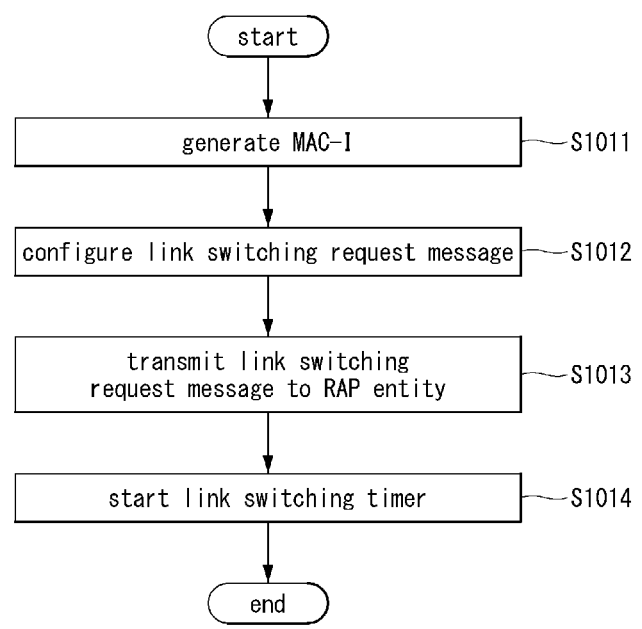
FIG. 11 is a flowchart illustrating a first exemplary embodiment of an operation method of an RRC entity of a remote terminal.

FIG. 11 is a flowchart illustrating a first exemplary embodiment of an operation method of an RRC entity of a remote terminal.

Referring to FIG. 11, in the operation method of an RRC entity of a remote terminal, the RRC entity of the remote terminal may generate a message authentication code for integrity (MAC-I) by processing integrity protection based on the relay RNTI, root node address, RAP entity ID, and the like when the configuration of the relay link is completed (S1011). In addition, the RRC entity may configure the link switching request message including the relay RNTI, root node address, RAP entity ID, signaling radio bearer 1 (SRB1) uplink (UL) count (COUNT), and MAC-I information (S1012). Then, the RRC entity of the remote terminal may transmit the configured link switching request message to the RAP entity of the remote terminal (S1013). In addition, the RRC entity of the remote terminal may start a link switching timer (e.g., timer Txx) (S1014).

Referring again to FIG. 10, upon receiving the link switching request message from the RRC entity, the RAP entity of the remote terminal may configure a relay information setup request message by forming a relay information setup request control PDU using the relay RNTI, root node address, RAP entity ID, SRB1 UL count, and MAC-I information of the link switching request message. Then, the RAP entity of the remote terminal may transmit the relay information setup request message to the RAP entity of the relay terminal (S1020-1). Then, the RAP entity of the relay terminal may register the routing information in the relay information setup request control PDU included in the relay information setup request message to a routing table. Then, the RAP entity of the relay terminal may transmit the received relay information setup request message to a RUE RAP entity of the base station (S1020-2). Meanwhile, the RUE RAP entity of the base station receiving the relay information setup request message from the RAP entity of the relay terminal may register the routing information in the relay information setup request control PDU included in the relay information setup request message to a routing table. The RUE RAP entity of the base station may transmit the received relay information setup request message to a rUE RAP entity of the base station (S1020-3). Accordingly, the rUE RAP entity of the base station may configure a link switching request message using the relay RNTI, root node address, RAP entity ID, SRB1 UL count, and MAC-I information included in the received relay information setup request message, and deliver it to an RRC entity of the base station (S1030). Then, the RRC entity of the base station may perform integrity protection on the link switching request message, and perform link switching according to the link switching request of the link switching request message when an integrity check on the message is successful (S1040). Then, the RRC entity may generate a link switching message according to the link switching and deliver it to the rUE RAP entity of the base station (S1050).

Figure 12:
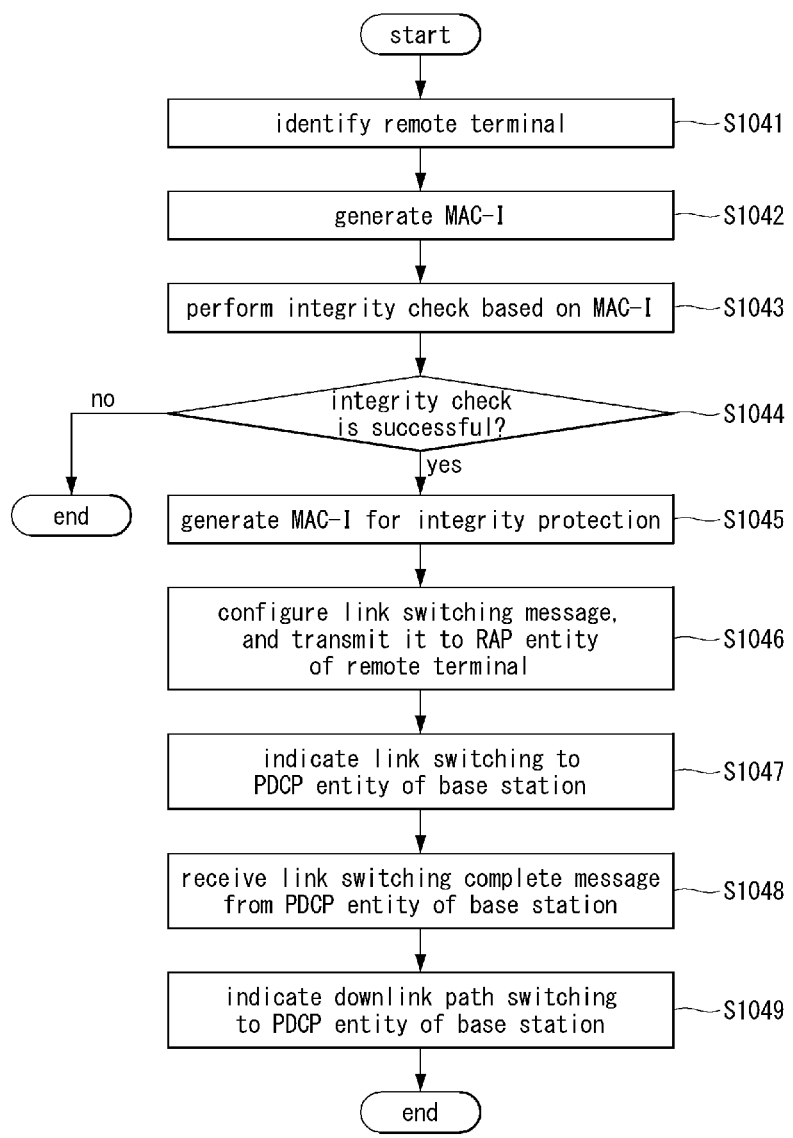
FIG. 12 is a flowchart illustrating a first exemplary embodiment of a link switching method of an RRC entity of a base station.

FIG. 12 is a flowchart illustrating a first exemplary embodiment of a link switching method of an RRC entity of a base station.

Referring to FIG. 12, in the link switching method of the RRC entity of the base station, upon receiving the link switching request message, the RRC entity of the base station may identify the remote terminal based on the relay RNTI included in the received link switching request message (S1041). Then, the RRC entity of the base station may generate a MAC-I based on the relay RNTI, root node address, RAP entity ID, and SRB1 UL count included in the link switching request message (S1042). Then, the RRC entity of the base station may perform integrity check based on the generated MAC-I to authenticate validity of the terminal (S1043). Accordingly, the RRC entity of the base station may determine whether the integrity check is successful (S1044), and if the integrity check fails, the RRC entity of the base station may terminate the link switching. On the other hand, if the integrity check is successful, the RRC entity of the base station may generate a MAC-I for integrity protection based on the relay RNTI, root node address, and RAP entity ID (S1045).

In addition, the RRC entity of the base station may generate a link switching message including the generated MAC-I, relay RNTI, root node address, RAP entity ID, and SRB1 downlink (DL) count, and deliver it to the rUE RAP entity of the base station (S1046). In this case, the RRC entity of the base station may instruct a PDCP entity of the base station to switch an uplink path from the Uu access link to the relay link (S1047). According to the request of the RRC entity of the base station, the PDCP entity may generate a link switching complete message after switching the uplink path from the Uu access link to the relay link and transmit it to the RRC entity of the base station. Accordingly, the RRC entity of the base station may receive the link switching complete message from the PDCP entity of the base station (S1048). As such, when the RRC entity of the base station receives the link switching complete message from the PDCP entity of the base station, it may instruct the PDCP entity of the base station to switch a downlink path from the Uu access link to the relay link (S1049). Accordingly, the PDCP entity of the base station may switch the downlink path from the Uu access link to the relay link.

Referring again to FIG. 10, upon receiving the link switching message from the RRC entity of the base station, the rUE RAP entity of the base station may configure a relay information setup control PDU including the MAC-I, relay RNTI, root node address, RAP entity ID, and SRB1 DL count included in the link switching message, generate a relay information setup message including the relay information setup control PDU, and transmit it to the RUE RAP entity of the base station (S1060-1). Accordingly, the RUE RAP entity of the base station may transmit the relay information setup message received from the rUE RAP entity of the base station to the RAP entity of the relay terminal (S1060-2).

Accordingly, the RAP entity of the relay terminal receiving the relay information setup message may activate a routing table entry in which the routing information included in the relay information setup control PDU is stored. Then, the RAP entity of the relay terminal may transmit the relay information setup message including the relay information setup control PDU (S1060-3). Accordingly, the RAP entity of the remote terminal may receive the relay information setup message from the RAP entity of the relay terminal, generate a link switching message including the MAC-I, relay RNTI, root node address, RAP entity ID, and SRB1 DL count included in the received relay information setup message, and transmit it to the RRC entity of the remote terminal (S1070). As such, upon receiving the link switching message, the RRC entity of the remote terminal may perform integrity protection, and if the integrity check is successful, the RRC entity of the remote terminal may perform link switching by transmitting uplink data through the relay link (S1080).

Figure 13:
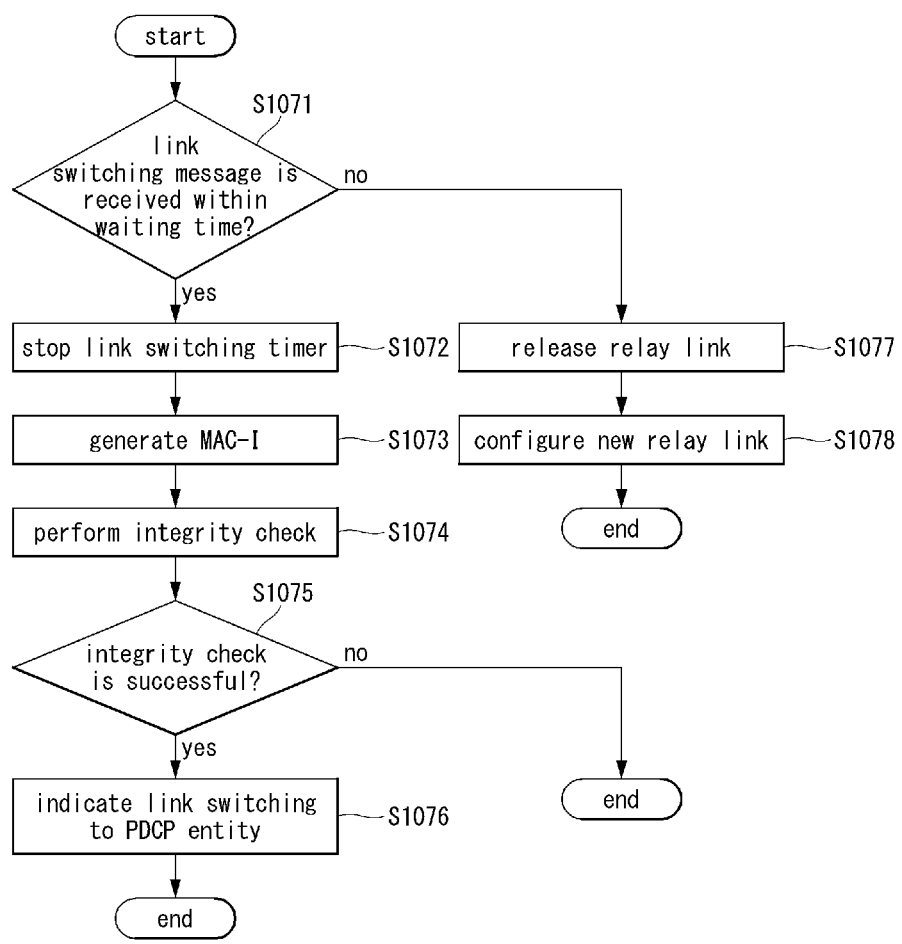
FIG. 13 is a flowchart illustrating a first exemplary embodiment of a link switching method of an RRC entity of a remote terminal.

FIG. 13 is a flowchart illustrating a first exemplary embodiment of a link switching method of an RRC entity of a remote terminal.

Referring to FIG. 13, in the link switching method of the RRC entity of the remote terminal, the RRC entity of the remote terminal may determine whether the link switching message is received within a waiting time by referring to the running link switching timer (S1071). As a result of the determination, the RRC entity of the remote terminal may stop the link switching timer if the link switching message is received within the waiting time (S1072). In addition, the RRC entity of the remote terminal may generate a MAC-I based on the relay RNTI, root node address, RAP entity ID, and SRB1 DL count of the link switching message (S1073). Then, the RRC entity of the remote terminal may perform integrity check by comparing the generated MAC-I with the MAC-I included in the received link switching message (S1074).

The RRC entity of the remote terminal may determine whether the integrity check is successful (S1075), and if the integrity check fails, the RRC entity of the remote terminal may terminate the link switching. On the other hand, if the integrity check is successful, the RRC entity of the remote terminal may instruct the PDCP entity of the remote terminal to switch a path from the Uu access link to the relay link (S1076). Then, the PDCP entity of the remote terminal may switch the path from the Uu access link to the relay link. On the other hand, if the link switching message is not received within the waiting time as a result of determining whether the link switching message is received within the waiting time by referring to the running link switching timer, the RRC entity of the remote terminal may release the configured relay link (S1077), and may perform a process of configuring a new relay link (S1078).

Referring again to FIG. 10, after indicating the link switching to the PDCP entity of the remote terminal, the RRC entity of the remote terminal may generate a link switching complete message, and deliver it to the RRC entity of the base station through the PDCP entity of the remote terminal, RRC entity of the remote terminal, RAP entity of the relay terminal, RUE RAP entity of the base station, rUE RAP entity of the base station, and PDCP entity of the base station (S1090).

Meanwhile, when the configuration of the sidelink or the relay link is completed, the remote terminal may perform a procedure for configuring the routing information while performing the link switching process.

Figure 14:
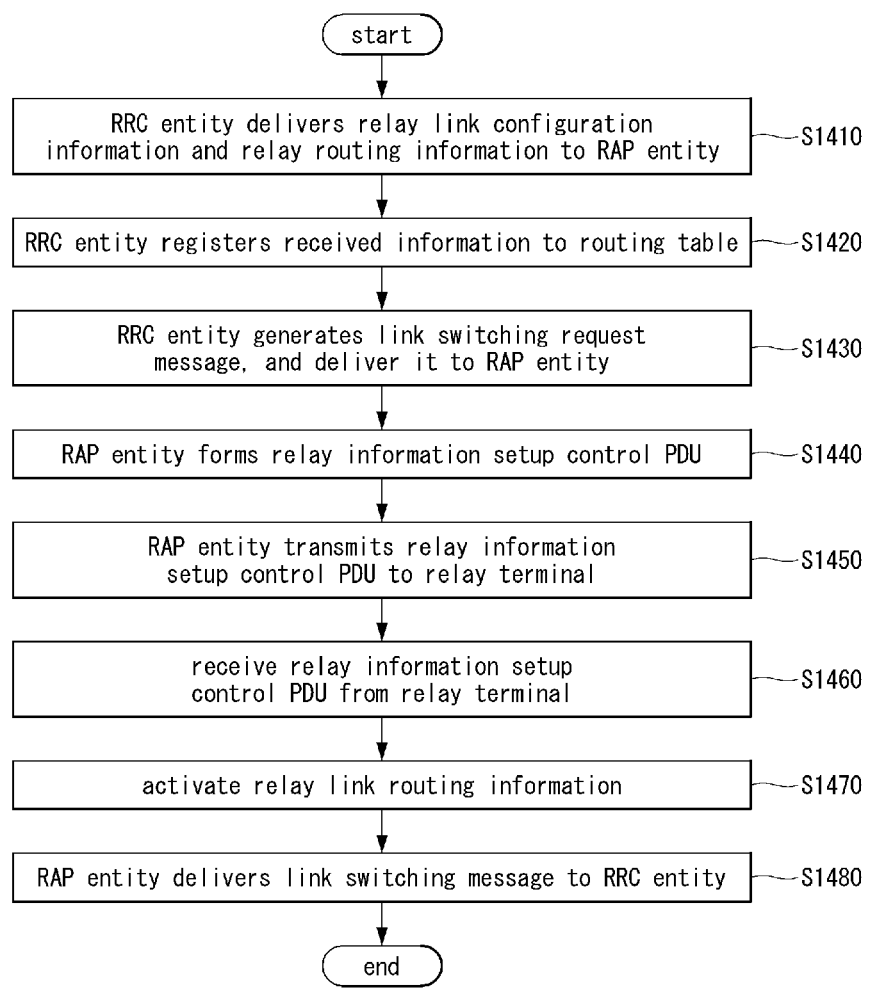
FIG. 14 is a flowchart illustrating a first exemplary embodiment of a method for configuring routing information performed by a remote terminal.

FIG. 14 is a flowchart illustrating a first exemplary embodiment of a method for configuring routing information performed by a remote terminal.

Referring to FIG. 14, in the method of configuring routing information performed by the remote terminal, the RRC entity of the remote terminal may deliver to the RAP entity of the remote terminal relay link configuration information including a source layer 2 ID, destination layer 2 ID, and the like and relay routing information including the root node address, the branch node address, the RAP entity ID, and the like (S1410). Then, the RAP entity of the remote terminal may receive the root node address, branch node address, RAP entity ID, and the like from the RRC entity of the remote terminal, and register them to the routing table (S1420). Thereafter, the RRC entity of the remote terminal may generate the link switching request message and deliver it to the RAP entity of the remote terminal (S1430). Then, the RAP entity of the remote terminal may form a relay information setup control PDU including the link switching request message (S1440), and transmit it to the relay terminal as the relay information setup request message (S1450). Here, the relay information setup request control PDU may include the root node address, branch node address, RAP entity ID, and the like as relay link routing information. Thereafter, when the RAP entity of the remote terminal receives the relay information setup control PDU including the link switching message from the relay terminal through the relay information setup message (S1460), the RAP entity of the remote terminal may activate the registered relay link routing information (S1470). In addition, the RAP entity of the remote terminal may deliver the link switching message included in the relay information setup message to the RRC entity of the remote terminal (S1480). Accordingly, the RRC entity of the remote terminal may perform the link switching.

Figure 15:
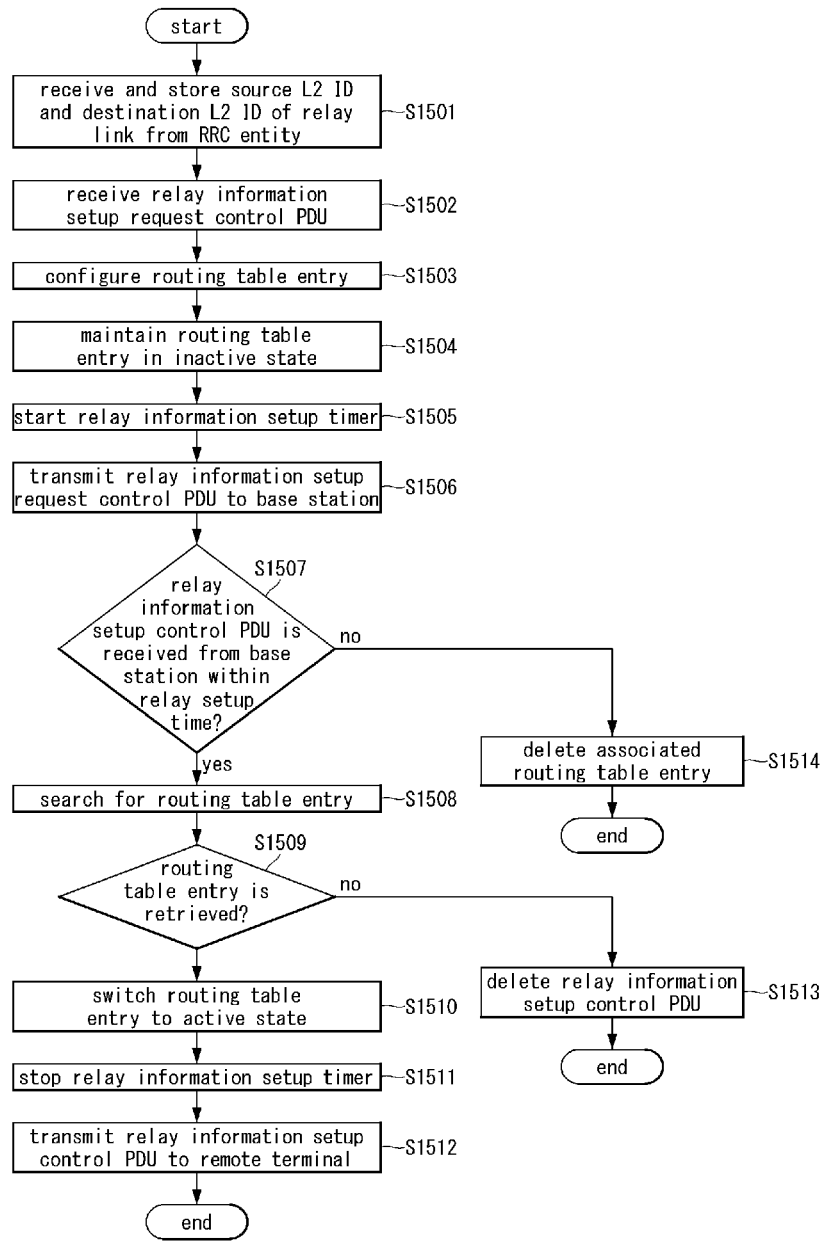
FIG. 15 is a flowchart illustrating a first exemplary embodiment of a method for configuring routing information performed by a RAP entity of a relay terminal.

FIG. 15 is a flowchart illustrating a first exemplary embodiment of a method for configuring routing information performed by a RAP entity of a relay terminal.

Referring to FIG. 15, in the method for the RAP entity of the relay terminal to configure routing information, the RRC entity of the relay terminal may transmit information on the source layer 2 ID and destination layer 2 ID of the relay link to the RAP entity of the relay terminal when the configuration of the relay link is completed. Then, the RAP entity of the relay terminal may receive the information from the RRC entity of the relay terminal, and store the source layer 2 ID and the destination layer 2 ID of the relay link (S1501). In addition, upon receiving the relay information setup request control PDU including the root node address, branch node address, RAP entity ID, and the like from the RAP entity of the remote terminal by using the stored source layer 2 ID and destination layer 2 ID through the relay information setup request message (S1502), the RAP entity of the relay terminal may configure a routing table entry based on the routing information such as the root node address, branch node address, RAP entity ID, source layer 2 ID, destination layer 2 ID, and the like (S1503). Then, the RAP entity of the relay terminal may start a relay information setup timer (e.g., timer T_s) (S1505) while maintaining the configured routing table entry in an inactive state (S1504). In addition, the RAP entity of the relay terminal may forward the relay information setup request control PDU to the base station through the relay information setup request message (S1506).

Thereafter, the RAP entity of the relay terminal may determine whether the relay information setup control PDU is received from the base station through the relay information setup message within a relay setup time by referring to the relay information setup timer (S1507). As a result of the determination, if the RAP entity of the relay terminal receives the relay information setup control PDU from the base station within the relay setup time, the RAP entity of the relay terminal may search for a routing table entry based on the root node address, branch node address, and RAP entity ID included in the relay information setup control PDU (S1508). When a routing table entry is retrieved, the RAP entity of the relay terminal may switch the retrieved routing table entry to an active state (S1510), and may stop the relay information setup timer (S1511). Then, the RAP entity of the relay terminal may transmit the received relay information setup control PDU to the remote terminal through the relay information setup message (S1512). If a routing table entry is not retrieved in the routing table, the RAP entity of the relay terminal may delete the received relay information setup control PDU (S1513). On the other hand, the RAP entity of the relay terminal may delete the associated routing table entry if the relay information setup control PDU is not received within the relay setup time by referring to the relay information setup timer (S1514).

Figure 16:
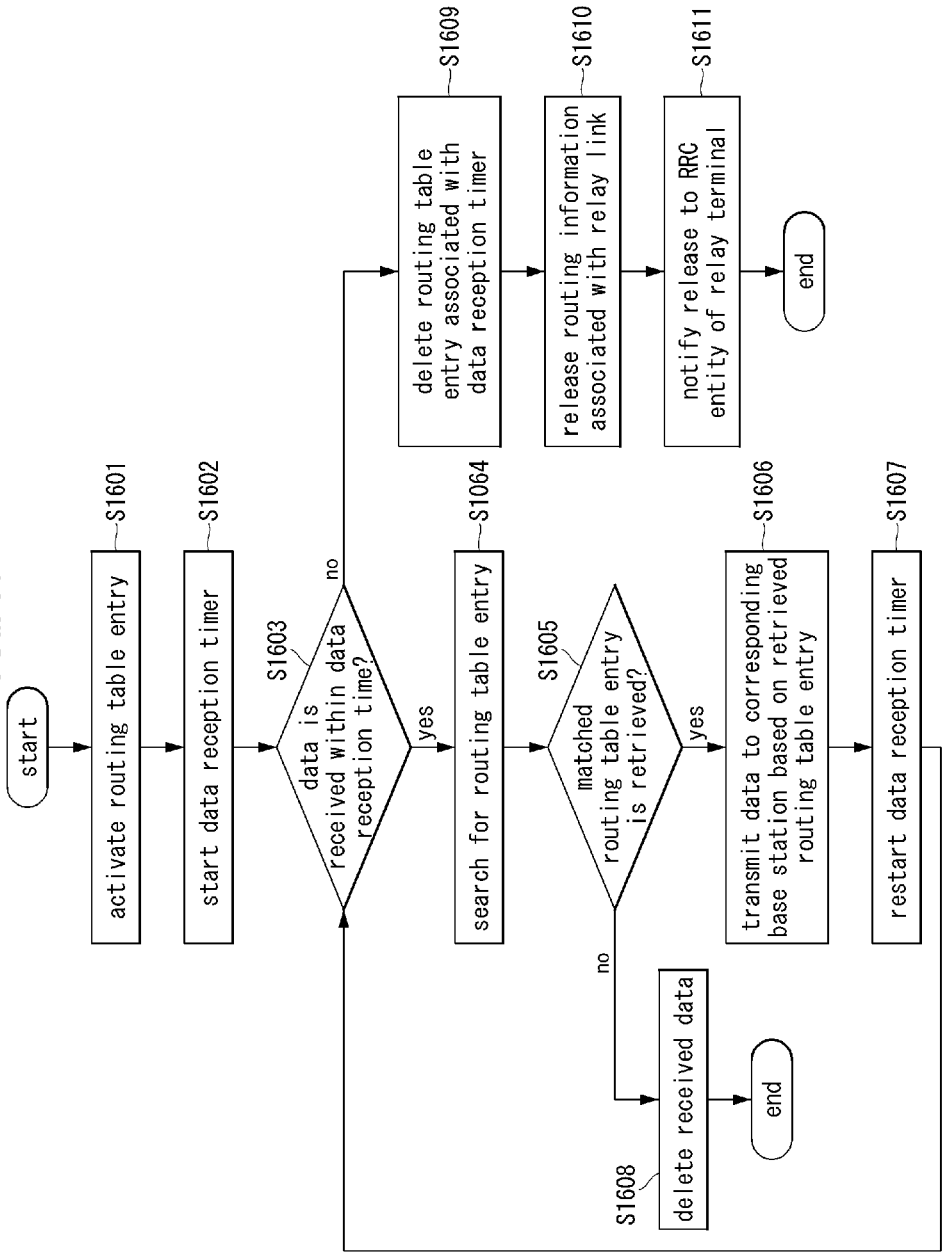
FIG. 16 is a flowchart illustrating a first exemplary embodiment of a method for data relaying performed by a relay terminal.

FIG. 16 is a flowchart illustrating a first exemplary embodiment of a method for data relaying performed by a relay terminal.

Referring to FIG. 16, in the method for data relaying performed by the relay terminal, the RAP entity of the relay terminal may activate the routing table entry (S1601) and may start a data reception timer (e.g., T_a) (S1602). The RAP entity of the relay terminal may determine whether data is received within a data reception time by referring to the data reception timer (S1603). If data is received within the data reception time, the RAP entity of the relay terminal may search for a routing table entry based on the root node address, branch node address, and RAP entity ID included in the received data (S1604). The RAP entity of the relay terminal may determine whether a matched routing table entry is retrieved (S1605), and if a matched routing table entry is retrieved, the RAP entity of the relay terminal may transmit the data to the corresponding base station based on the retrieved routing table entry (S1606). In addition, the RAP entity of the relay terminal may restart the data reception timer (S1607). If a matched routing table entry is not found in the routing table, the RAP entity of the relay terminal may delete the received data (S1608). On the other hand, the RAP entity of the relay terminal may delete the routing table entry associated with the data reception timer if data is not received within the data reception time by referring to the data reception timer (S1609). In addition, the RAP entity of the relay terminal may release the routing information associated with the relay link if there is no routing table entry associated with the relay link (S1610), and may notify the RRC entity of the relay terminal of such the release (S1611).

Figure 17:
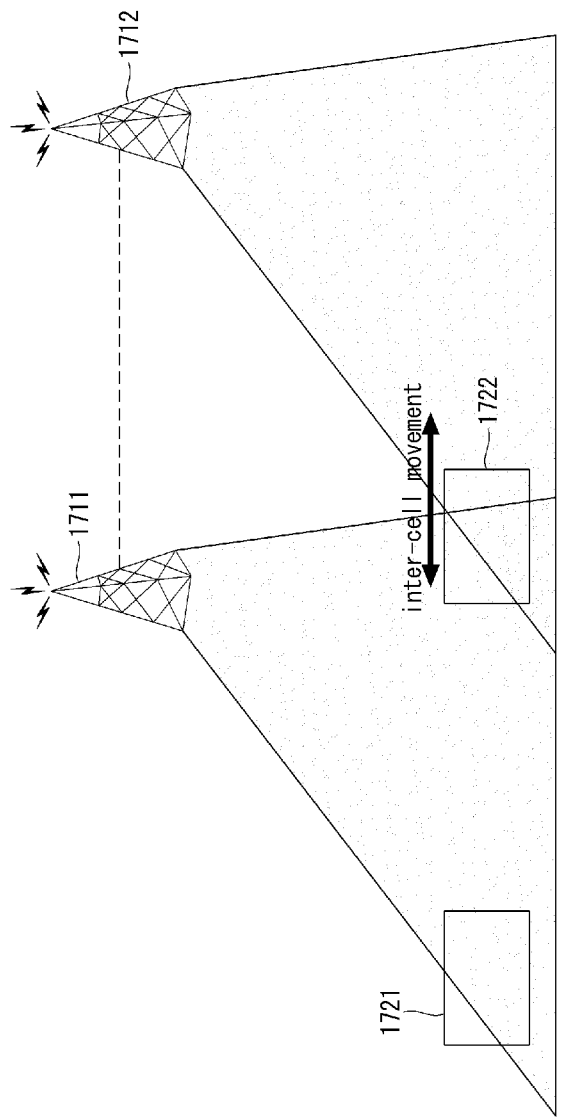
FIG. 17 is a conceptual diagram illustrating a third exemplary embodiment of a terminal relay system.

FIG. 17 is a conceptual diagram illustrating a third exemplary embodiment of a terminal relay system.

Referring to FIG. 17, a terminal relay system may include a first base station 1711, a second base station 1712, a first terminal 1721, and a second terminal 1722. The first terminal 1721 and the second terminal 1722 may be located in a communication service coverage of the first base station 1711. As such, since the first terminal 1721 is located in the communication service coverage of the first base station 1711, the first terminal 1721 may directly access the first base station 1711 to transmit and receive data to and from the first base station 1711. In addition, since the second terminal 1722 is located in the communication service coverage of the second base station 1712, the second terminal 1722 may directly access the second base station 1712 to transmit and receive data to and from the second base station 1712. From such the state, the first terminal 1721 may enter a communication disconnected state in which data cannot be transmitted and received to and from the first base station 1711 due to an obstacle or the like. In this case, the first terminal 1721 may access the first base station 1711 via the second terminal 1722 to transmit and receive data to and from the first base station 1711. In this case, the second terminal 1722 may relay communication between the first base station 1711 and the first terminal 1721.

Meanwhile, in such the situation, the second terminal 1722 may move to a communication service coverage of the second base station 1712 by handover or the like. In this case, since the second terminal 1722 is located in the communication service coverage of the second base station 1712, the second terminal 1722 may access the second base station 1712 to transmit and receive data to and from the second base station 1712. In such the state, the first terminal 1721 may transmit and receive data to and from the first base station 1711 via the second base station 1712 through the second terminal 1722. In this case, the second terminal 1722 may relay communication between the second base station 1712 and the first terminal 1721. In addition, the second base station 1712 may relay communication between the first base station 1711 and the second terminal 1722.

As described above, when the second terminal 1712 moves from the communication service coverage of the first base station 1711 to the communication service coverage of the second base station 1712 due to a handover or the like, a change in the branch node address may be required. In this case, the second terminal 1722 may transmit a relay information change indication message to the first terminal 1721 to inform the first terminal 1721 that the branch node address has been changed. Here, the relay information change indication message may include the changed new branch node address.

Figure 18:
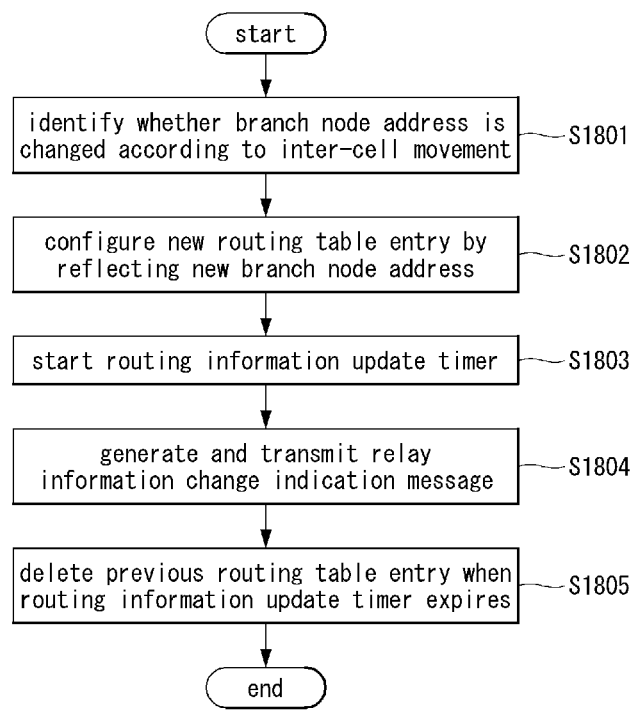
FIG. 18 is a flowchart illustrating a first exemplary embodiment of a method of changing a branch node address performed by a relay terminal.

FIG. 18 is a flowchart illustrating a first exemplary embodiment of a method of changing a branch node address performed by a relay terminal.

Referring to FIG. 18, in the method for the relay terminal to change the branch node address, the RAP entity of the relay terminal may identify whether the branch node address is changed according to inter-cell movement (S1801). As a result of identifying whether the branch node address is changed, if the branch node address is changed, the RAP entity of the relay terminal may configure a new routing table entry by reflecting the new branch node address to the root node address and RAP entity ID of the previous routing table entry (S1802). Then, the RAP entity of the relay terminal may start a routing information update timer (e.g., timer T_a) associated with the new routing table entry (S1803).

Thereafter, the RAP entity of the relay terminal may generate and transmit a relay information change indication message through the relay link in order to notify remote terminals connected to the relay link of the change in the branch node address (S1804). Then, the RAP entity of the relay terminal may delete the previous routing table entry if the routing information update timer expires by referring to the routing information update timer (S1805).

Figure 19:
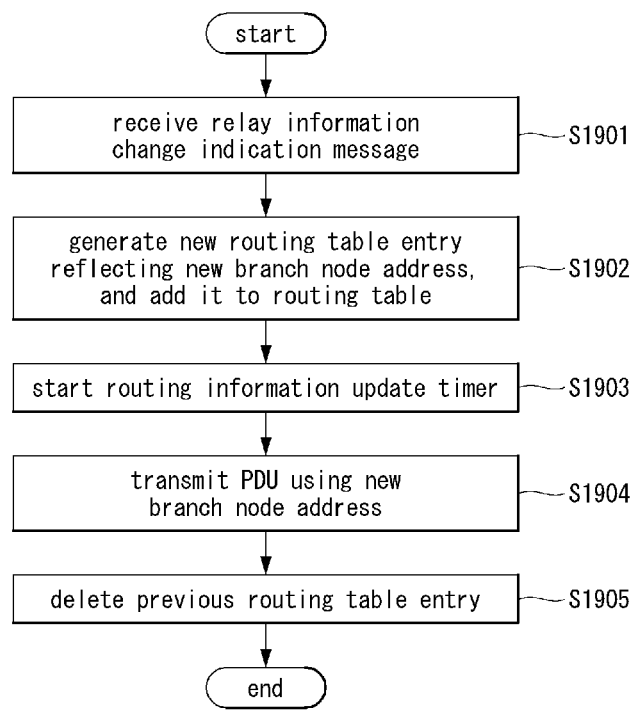
FIG. 19 is a flowchart illustrating a first exemplary embodiment of a method for changing a branch node address performed by a remote terminal.

FIG. 19 is a flowchart illustrating a first exemplary embodiment of a method for changing a branch node address performed by a remote terminal.

Referring to FIG. 19, in the method of changing the branch node address performed by the remote terminal, upon receiving the relay information change indication message from the relay terminal (S1901), the RAP entity of the remote terminal may generate and add a new routing table entry reflecting the new branch node address to the root node address and the RAP entity ID of the previous routing table entry to the routing table (S1902). In addition, the RAP entity of the remote terminal may start a routing information update timer (e.g., timer T_a) associated with the routing table entry added to the routing table (S1903). Then, the RAP entity of the remote terminal may transmit a PDU using the new branch node address (S1904). In addition, the RAP entity of the remote terminal may delete the previous routing table entry when the routing information update timer expires by referring to the routing information update timer (S1905).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
    configuring a Uu access link with a base station, and receiving a first message from the base station, the first message including a relay radio network temporary identifier (RNTI) for identifying the first terminal, a node address of the base station, and a relay adaptation protocol (RAP) entity identifier (ID) for identifying a RAP entity configured for the first terminal;
    configuring a relay link with a second terminal when communication with the base station is disconnected;
    requesting link switching by transmitting to the base station a second message via the second terminal, the second message including the relay RNTI, the node address, and the RAP entity ID; and
    receiving a response to the second message from the base station via the second terminal, and switching a link with the base station from the Uu access link to the relay link.

2. The operation method according to claim 1, wherein the requesting of the link switching comprises:
    generating a first message authentication code for integrity (MAC-I) by processing integrity protection based on the relay RNTI, the node address, and the RAP entity;

generating the second message including the relay RNTI, the node address, the RAP entity, and the first MAC-I information; and requesting the link switching by transmitting the second message to the base station via the second terminal.

3. The operation method according to claim 1, wherein the receiving of the response and the switching of the link comprises:

receiving the response to the second message including the relay RNTI, the node address, and a second MAC-I from the base station via the second terminal;

generating a third MAC-I by processing integrity protection based on the relay RNTI and the node address; and in response to determining that the third MAC-I and the second MAC-I match, switching the link with the base station from the Uu access link to the relay link, and transmitting uplink data through the relay link.

4. The operation method according to claim 1, further comprising, after the configuring of the relay link, configuring a routing table entry based on the node address, the RAP entity ID, and a first branch node address received from the second terminal in the configuring of the relay link; and in response to receiving the response to the second message from the base station, activating the routing table entry.

5. The operation method according to claim 4, further comprising:

receiving, from the second terminal, a third message requesting update of the routing table entry, the third message including a second branch node address; and updating the routing table entry by reflecting the second branch node address.

6. The operation method according to claim 1, further comprising:

starting a timer after transmitting the second message; and releasing the relay link if the response to the second message is not received within a waiting time defined by the timer.

* * * * *